June 30, 1964 R. E. MEHLMAN 3,138,878
SPIRIT LEVEL
Filed June 26, 1961

INVENTOR
Ralph E. Mehlman

BY John Kirkland Smith, Jr.
ATTORNEY

United States Patent Office 3,138,878
Patented June 30, 1964

3,138,878
SPIRIT LEVEL
Ralph E. Mehlman, 1429 Berekeley Road,
Columbia, S.C.
Filed June 26, 1961, Ser. No. 119,618
2 Claims. (Cl. 33—211)

This invention has to do with spirit levels, more particularly this invention has to do with a spirit level having a longitudinal curvature in one plane and a critical non-circular cross section transverse to the longitudinal axis.

It is an object of this invention to provide a level which is more quickly responsive to unlevel surfaces than are the levels heretofore known. In the levels heretofore known, the bubble traveled longitudinally of the level and generally at a relatively slow speed due to the ratio of bubble-to-liquid. In the levels of the straight line type, the bubble always floated to the upper-most end of the tube and always at the relatively slow speed. This, of course, required some further manual operation to bring the level bubble back to a readable position.

It is an object of this invention to provide a spirit level tube which has a substantial longitudinal curvature in one plane, which curvature is the arc-of-a-circle, in combination with a critical non-circular end cross-section whereby the bubble will rest and travel on a volume of liquid relative to the bubble size which is a larger relative volume than heretofore known so that the reading is quicker and always at the center position of the level structure as distinguished from being at or toward an end of the level tube. I have found that tubes of uniform cross-section diameter filled to give a particular bubble will not respond as quickly as when the same size bubble is used in the particular end cross section defined by this invention.

It is another object of this invention to provide a spirit level in combination with the above feature that has graduated degree lines to give an immediate and direct reading in degrees or any other unit of measure.

It is another object of this invention to provide a spirit level that once placed on the surface to be measured, requires no further adjustment by the user in order to get an actual and accurate reading.

There are many practical applications available for my invention, one of which is in combination with a golf club handle to indicate the degree of unlevelness of the putting green. Heretofore the level in the golf club handle has been of the short and straight-line type of circular end cross-section in which the bubble always traveled slowly to the extreme upper end of the bubble tube. This slow and extreme travel by the bubble required the golfer to pick up the lower end of the club in order to bring the slowly responding bubble back to the center position whereupon he would have to make a second reading of the distance between the lifted club end and the ground in order to determine the difference, which difference then tells him the amount of unlevelness. With my invention in combination with a golf club handle, all the golfer has to do is lay the club on the ground and due to the level curvature, the graduated lines, the quickly responding bubble, and to the fact that the bubble is always in the "up" or North Pole position, as it were, the golfer gets an immediate reading without any further effort on his part.

These and other objects and applications will become apparent from referring to the drawings in which.

Figure 1:
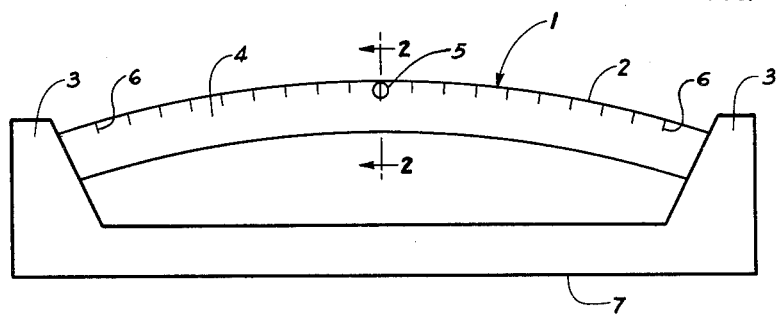
FIGURE 1 represents a side view of my invention showing the arc-of-a-circle curvature of the level tube, the support structure means and the relationship of the small, near spherical, bubble with a large volume of liquid upon which the bubble floats or traverses.

Referring more particularly to FIGURE 1 of the drawings will show my invention shown generally at 1 comprising, in combination, a transparent level tube 2 having a support structure 3. In the space defined by the tube 2 and the sealed ends of the level tube 2 is contained liquid 4 of suitable viscosity and of sufficient quantity to leave a near spherical bubble 5. Contained on the tube 2 are graduations 6 so positioned to indicate degrees or inches or any other system of measure. The position of the degree markers is determined by the radius of curvature of the tube 2. Support structure 3 has a bottom surface 7 which bottom surface 7 is placed upon the particular surface, the level of which is to be determined. It can be seen that regardless of the surface upon which bottom surface 7 rests, due to the curvature of tube 2 the bubble 5 will always be at the uppermost position—at the top of the page—as it were.

Figure 2:
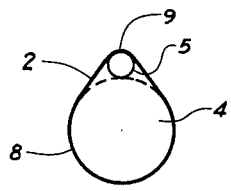
FIGURE 2 is a cross section taken along line 2—2 of FIGURE 1 showing the near spherical bubble on the tear-shaped end cross sectional leveling tube.

Referring now to FIGURE 2 which is a cross section taken along line 2—2 of FIGURE 1 will be found the tube 2 of generally tear-shaped end cross section containing the liquid 4 and the near spherical bubble 5 floating on liquid 4. It can be seen that the bottom generally circular portion 8 of the tube 2 is of dimensions considerably larger than the upper generally circular portion 9 of tube 2. This upper portion is ridge-like and runs along the top of the leveling tube 2 for the entire longitudinal distance of tube 2 and due to its reduced area as compared to the liquid containing bottom portion 8, the portion 8 has the net effect of cushioning the bubble 5 and also lowering the surface tension of the bubble 5 whereby the bubble 5 will assume its proper leveling position considerably quicker than in the circular cross section levels heretofore known.

Figure 3:
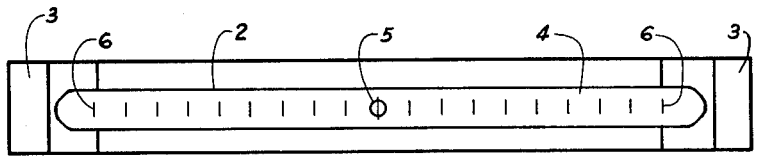
FIGURE 3 is a top view of FIGURE 1.

Referring now to FIGURE 3 will show a top view of the leveling tube 2 with support structure 3 and the liquid 4. On the top side of tube 2 is contained the graduations 6. When using my invention, the level is placed upon the surface for which the degree of levelness is to be determined, and due to the inherent nature of the bubble 5, the said bubble 5 will always appear at the uppermost position of the curved tube 2 and will fall under a particular graduation 6 which graduation 6 will give an instantaneous reading of the degree or distance of out-of-level.

Figure 4:
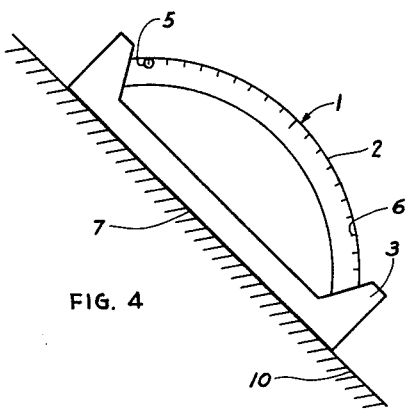
FIGURE 4 shows a practical application of my invention.

Referring now to FIGURE 4 will show my invention in one practical application. Surface 10 is known to be unlevel, to what degree is the problem. The leveling device 1 is placed so as to engage surface 10 by surface 7 and due to the curvature of tube 2 the bubble 5 will always travel to the extreme uppermost position. Due to the rapid travel of bubble 5, which rapid travel is effected by the cross sectional shape of tube 2, the user will get an immediate reading. If the particular graduation line 6 designated 45° on the tube is uppermost and thereby coincides with the bubble 5, the degree of unlevelness of surface 10 is 45°, which is determined instantaneously and directly.

It is to be understood that the level disclosed in FIGURE 1 could not measure as acutely as can the level disclosed in FIGURE 4. The maximum limit of measure of any particular level is defined by the radius of curvature of the tube 2, and the greater the arc the greater the travel and therefore the greater the measurement. The level in FIGURE 4 is able to measure up to 45 degrees since 45 degrees of an arc of a circle is defined by the longitudinal length of tube 2. The level in FIGURE 1 contains only about one-twelfth of a circumference or 30 degrees of an arc, and can therefore measure only 15 degree grades. Thus it can be seen that with this teaching one can design a level which can measure any particular need.

Having disclosed and described my invention, I claim:

1. Structure substantially as disclosed and described comprising a sealed tube having a uniform non-circular cross-sectional shape in a plane perpendicular to its longitudinal axis, said uniform cross-section defined by a bottom portion that is generally circular and which apexes into an upper generally circular portion, said upper portion having a smaller sectional area than said bottom portion, said upper portion having graduations thereon.

2. In combination, a spirit level and a support surface, said level comprising a tube containing liquid and a spherical air bubble floating on said liquid, said tube having graduated lines thereon, said tube having a longitudinal curvature in one plane, said curvature being the arc-of-a-circle, said tube further comprising longitudinally uniform a non-circular cross section in a plane perpendicular to said longitudinal axis, said uniform non-circular cross-section comprising an upper generally circular cross-section and a lower generally circular cross-section, said lower cross-section being larger than said upper cross-section said tube mounted at each end to said support surface, a center section of said tube being in an extended position from said support relative to the position of said ends.

References Cited in the file of this patent

UNITED STATES PATENTS

| 1,578,786 | Weston | Mar. 30, 1926 |
| 1,669,035 | Belfield | May 8, 1928 |

FOREIGN PATENTS

| 627,430 | Great Britain | Aug. 9, 1949 |